United States Patent
Rolefs

(10) Patent No.: US 8,648,139 B2
(45) Date of Patent: Feb. 11, 2014

(54) METHOD OF MAKING AN ELASTIC FILM, IN PARTICULAR FOR A HYGIENIC ARTICLE

(75) Inventor: Mike Rolefs, Steinfurt (DE)

(73) Assignee: Mondi Gronau GmbH, Gronau (DE)

( * ) Notice: Subject to any disclaimer, the term of this patent is extended or adjusted under 35 U.S.C. 154(b) by 0 days.

(21) Appl. No.: 12/970,101

(22) Filed: Dec. 16, 2010

(65) Prior Publication Data
US 2011/0178223 A1 Jul. 21, 2011

(30) Foreign Application Priority Data
Dec. 19, 2009 (EP) .................................... 09015759

(51) Int. Cl.
C08K 5/01 (2006.01)
C08K 7/26 (2006.01)
C08L 53/02 (2006.01)

(52) U.S. Cl.
CPC ... C08K 5/01 (2013.01); C08K 7/26 (2013.01); C08L 53/02 (2013.01)
USPC ........................................... 524/450; 525/98

(58) Field of Classification Search
USPC ........................................... 524/450; 525/98
See application file for complete search history.

(56) References Cited

U.S. PATENT DOCUMENTS

| | | | |
|---|---|---|---|
| 4,367,312 A * | 1/1983 | Bontinck et al. | 525/93 |
| 5,021,405 A * | 6/1991 | Klimisch | 514/63 |
| 6,730,734 B1 * | 5/2004 | Hamilton et al. | 524/523 |
| 6,805,961 B1 * | 10/2004 | Watanabe et al. | 428/446 |
| 7,163,745 B2 | 1/2007 | Mangold | |
| 2001/0044488 A1 * | 11/2001 | Yasuda et al. | 524/341 |
| 2004/0058107 A1 * | 3/2004 | Becraft et al. | 428/35.7 |
| 2007/0141352 A1 | 6/2007 | Calhoun et al. | |
| 2008/0193704 A1 * | 8/2008 | Ogawa et al. | 428/76 |
| 2008/0202336 A1 * | 8/2008 | Hofer et al. | 95/90 |
| 2009/0253836 A1 * | 10/2009 | Flat et al. | 524/101 |
| 2009/0286444 A1 | 11/2009 | Hughes | |
| 2010/0029824 A1 * | 2/2010 | Steigelmann et al. | 524/443 |
| 2011/0143112 A1 * | 6/2011 | Cai et al. | 428/217 |
| 2012/0026719 A1 * | 2/2012 | Sugiyama et al. | 362/84 |

FOREIGN PATENT DOCUMENTS

| | | |
|---|---|---|
| EP | 0749295 B | 7/2000 |
| WO | WO 98/01300 | 1/1998 |
| WO | WO 98/51738 | 11/1998 |
| WO | WO 0110966 A1 * | 2/2001 |
| WO | 2009/138887 A | 11/2009 |

OTHER PUBLICATIONS

Styrolution (Styroflex (SBC), 2011, 1 page).*
Ferreira (The Nanopore Inner Sphere Enhancement Effect on Cation Adsorption: Sodium, Potassium, and Calcium. Soil Sci. Soc. Am. J., vol. 75, No. 2, 2011, pp. 389-396).*
US Statutory Invention Registration H1732 Johnson, Theresa, Jun. 2, 1998 "Absorbent Articles Containing Antibacterial Agents in the Topsheet for Odor Control".

* cited by examiner

Primary Examiner — Ling Choi
Assistant Examiner — Brieann R Fink
(74) Attorney, Agent, or Firm — Jonathan Myers; Andrew Wilford

(57) ABSTRACT

An elastic film for a hygienic article is made by first premixing polymer components to form a polymer composite that contains styrene block copolymers and then extruding the polymer composite to make at least one layer. During the premixing or the extruding zeolites are added having pores of a size larger than 2.5 Angstrom and smaller than 5.5 Angstrom.

5 Claims, 3 Drawing Sheets

Fig. 3

| Tester | TK30988 Reference (50% Styrol-Block-Copolymer +35% PS + PE + Additive) | TK 30989 | TK 30990 | TK 30991 | TK 30992 |
|---|---|---|---|---|---|
| Pr 1 | 2 | 1 | 1 | 3 | 0 |
| Pr 2 | 2 | 1 | 0 | 1 | 1 |
| Pr 3 | 2 | 2 | 1 | 2 | 1 |
| Pr 4 | 3 | 2 | 2 | 2 | 3 |
| Pr 5 | 2 | 1 | 1 | 2 | 1 |
| Average: | 2.2 | 1.4 | 1 | 2 | 1.2 |
| Median: | 2 | 1 | 1 | 2 | 1 |
| | Reference without Ceolith Cast extrusion | 1% Zeolite powder H-MFI-400 (mixed in during compounding) | 1% Zeolite powder HMFI-1200 (mixed in during compounding) | 1% Zeolite powder H-MFI-400 (mixed in during extrusion) | |

Fig. 4

| Tester | Sample | | |
|---|---|---|---|
| | TK 31140 Reference (50% Styrol-Block-Copolymer + 35% PS + PE + Additive) | TK 31141 | TK 31142 |
| Pr 1 | 4 | 3 | 2 |
| Pr 2 | 4 | 1 | 2 |
| Pr 3 | 4 | 3 | 2 |
| Pr 4 | 3 | 2 | 1 |
| Pr 5 | 3 | 2 | 2 |
| Pr 6 | 3 | 2 | 1 |
| Pr 7 | 3 | 1 | 1 |
| Average: | 3.4 | 2.0 | 1.6 |
| Median: | 3.0 | 2.0 | 2.0 |
| | Reference w/o zeolite powder | 1% Zeolite Powder H-MFI-1200 (mixed in during compounding) | 2% Zeolite Powder H-MFI-1200 (mixed in during compounding) |

Fig. 5

| Tester | Sample | | | |
|---|---|---|---|---|
| | TK32143 | TK 32145 | TK 32146 | TK 32147 |
| Additive/type | Reference | 1% Zeolite portion | 2% Zeolite portion | 5% Zeolite portion |
| Pr1 | 3 | 3 | 3 | 3 |
| Pr2 | 3 | 3 | 2 | 1 |
| Pr3 | 4 | 3 | 1 | 1 |
| Pr4 | 4 | 2 | 2 | 2 |
| Pr5 | 3 | 2 | 3 | 2 |
| Pr6 | 3 | 2 | 1 | 1 |
| Pr7 | 2 | 1 | 2 | 1 |
| avg | 3.14 | 2.29 | 2.00 | 1.57 |

METHOD OF MAKING AN ELASTIC FILM, IN PARTICULAR FOR A HYGIENIC ARTICLE

FIELD OF THE INVENTION

The present invention relates to a plastic film. More particularly this invention concerns an elastic film used in making a hygiene article.

BACKGROUND OF THE INVENTION

An elastic film for a hygiene articles can be made by premixing polymer components to make a polymer composite that contains styrene block copolymers and subsequently, by extrusion of the polymer composite, at least one layer is created, zeolites being added to the base compound and/or during extrusion.

For the production of elastic films, first a polymer composite is produced by a compounding process. The compounding process is a plastic-finishing process for targeted optimization of the product properties. In the production of elastic films, in particular in the hygiene sector, the polymer composite very often contains styrene block copolymers because of the favorable property profile and the relatively low costs. In the compounding process, polymer components are premixed with additives such as oil. This mixing is preferably performed in dual-screw extruders.

Due to the high thermal load during the compounding and extrusion process, styrene monomers are released in the case of polystyrene-containing formulations. These styrene monomers have a characteristic odor that is often perceived as being objectionable.

In EP 0 749 295 (US H1732), a hygiene article is described that comprises an upper layer that is permeable to liquids and a lower layer that is impermeable to liquids. An absorbing core is located between the two layers. The upper layer is a plastic film provided with openings and containing an amount of zeolite that has been impregnated with a heavy metal ion. The production article is suitable for minimizing odors that are caused by body fluids and sweat.

In U.S. Pat. No. 7,163,745, an odor-adsorption agent is described that is used in particular in the area of hygiene articles. The odor adsorption means comprises a granulate onto which subsequently, zeolites are molten.

A method with the characteristics of the generic claim of patent claim 1 is known from WO 2009/138887 and US 2009/0286444. Zeolites are cited in addition to a number of other organic and inorganic particles as possible filler substances. By means of the filler substances, the opacity of the film, or also the permeability of gas or steam is to be adjusted. For example, by stretching in the area of filler substances, pores can be created in order to provide a micro-porous, breathable elastic film.

OBJECT OF THE INVENTION

It is the object of the present invention to develop a film that has at least one layer that minimizes the odor of styrene monomers.

SUMMARY OF THE INVENTION

In accordance with the invention, this object is attained in that during premising of the polymer components and/or during the extrusion of the polymer composite, zeolites are added that have pore sizes that are larger than 2.5 Angstrom and smaller than 5.5 Angstrom. As a result of this approach, the zeolites are embedded into the polymer matrix. This leads to a homogeneous distribution of the zeolites. The zeolites integrated into the layer adsorb styrene monomers that are released by the styrene block copolymers. Important for a targeted adsorption of styrene monomers is the selection of zeolites with a suitable size of pore openings between 2.5 Angstrom and 5.5 Angstrom. The elastic film can be designed as monofilm or be multilayered. Multilayered films can be produced by coextrusion. Thereby, in accordance with the invention, at least one layer contains zeolites that are introduced during compounding and/or extrusion.

The selection of the right type of zeolite is important for the effective adsorption of styrene monomers. Zeolites are crystalline aluminosilicates that occur in many modifications. They consist of a microporous structure of $AlO_4$ and $SiO_4$ tetrahedrons. Depending on the type of zeolite, a structure of uniform pores and/or channels results in which substances can be adsorbed. Zeolites of the structural type ZSM-5, which belong to the class of pentasiles, have been shown to be particularly suitable for the adsorption of styrene monomers. In the case of most pentasiles, the Si/Al ratio is between 1 and 100. Thus, the structure type ZSM-5 is one of the silicone-rich zeolites. ZSM-5 zeolites with high Si/Al relationships are marked by high hydrophobia, stability and thermal stability. The hydrophobic behavior of the ZSM-5 is important so that no preferential adsorption of water occurs at the zeolites. Thus, the film can adsorb styrene monomers effectively even under moist conditions.

According to IUPAC nomenclature, the structural type of the ZSM-5 is described as MFI, derived from: zeolite socony mobile five.

In a particularly advantageous embodiment of the invention, the weight proportion of zeolites in a layer is between 1% by weight and 5% by weight. If too little zeolite material is embedded, the adsorption relationship worsens. Too large of a proportion can alter the characteristic properties of the film.

A mixture can also be used consisting of two types of zeolites that are different in the size of their pore openings. The first type of zeolite has, for example, a pore opening of 3 Angstrom. The second type of zeolite has, for example a pore opening of approximately 5 Angstrom. The use of a mixture of two types of zeolites can be coordinated in a targeted manner relative to the dimensions of the styrene and leads to selective adsorption of these monomers.

The elastic film that is produced as per the method according to the invention is suitable for hygiene articles and can, for example, be used for the production of diaper closures, elastic elements of a diaper or similar. A suitable polymer mixture for the production of the film preferably contains more than 40% by weight of a thermoplastic elastomer from the group of styrene block copolymers. A styrene block copolymer can, in particular, be a styrene isoprene styrene block copolymer (SIS), styrene ethylene butylene styrene copolymer (SEBS), styrene butadiene styrene copolymer (SBS) or a mixture of these polymers. A preferred polymer composition contains a styrene block copolymer, polystyrene and polyethylene. Additionally, during compounding, plasticizer oils are added to the polymer components. As plasticizer oils, white oils are used, for example that are approved for use in medical applications. These are preferably aliphatic hydrocarbon compounds with a very high degree of purity.

BRIEF DESCRIPTION OF THE DRAWING

The above and other objects, features, and advantages will become more readily apparent from the following description, reference being made to the accompanying drawing in which:

FIGS. 3 to 5 are tables containing the results of odor tests of films.

SPECIFIC DESCRIPTION

Figure 1:
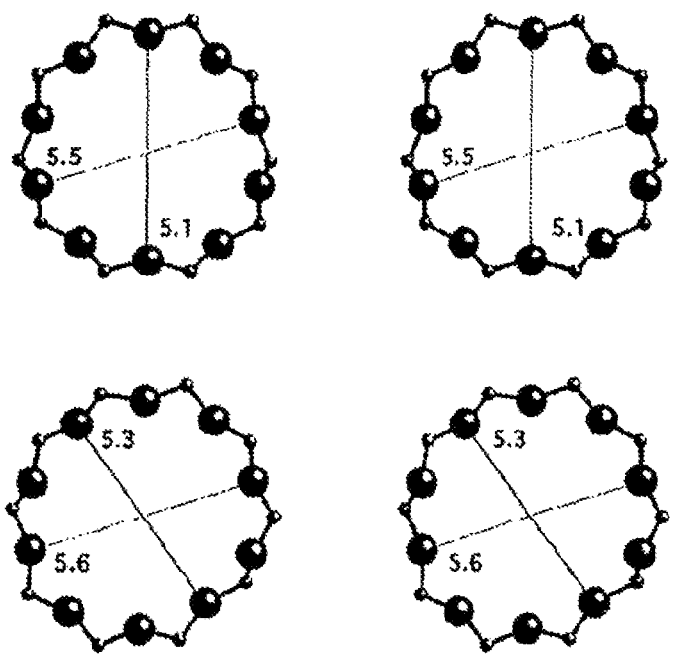
FIG. 1 is an illustration of the zeolites used.

FIG. 1 shows the structures of the zeolites that are used in the invention. These are zeolites with the structural type MFI (ZSM-5). In the MFI structure, there are two types of channels, one has pores extending parallel with a pore opening of 5.3 Å·5.6 Å(0.53 nm·0.56 nm) and the other has pores extending sine-shaped with a pore opening of 5.1 Å-5.5 Å (0.51 nm·0.55 nm). As shown in FIG. 1, a pore opening of these pores consists of ten tetrahedrons. That is why it is also described as a 10-ring-pore. The ZSM-5 is thus one of the medium pore zeolites.

Figure 2:
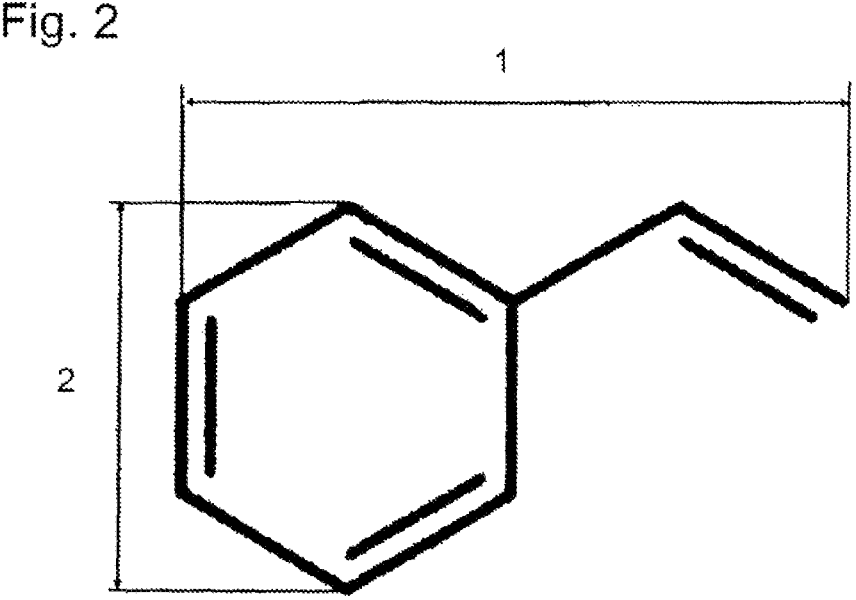
FIG. 2 is an illustration of a styrene molecule.

In FIG. 2, the structural formula of styrene is shown. The long side 1 of the styrene molecule has an aromatic ring and the vinyl group. The dimension of the long side is 485 pm. The short side 2 of the styrene molecule comprises only the aromatic ring. The dimension of the short side 2 is 280 pm. The surface of the styrene molecules is given as the product of the two dimensions A=485 pm·280 pm.

Preferably, the zeolites that are used are coordinated with the dimensions of the styrene molecule. Thereby, a mixture of two zeolite types has been shown to be advantageous. The first type of zeolite with a pore opening of approximately 3 Angstrom (=300 pm) corresponds approximately to the short side 2 of the styrene molecule. The second type of zeolite with a pore opening of approximately 5 Angstrom (=500 pm) corresponds approximately to the long side 1 of the styrene molecule. The use of a mixture of these two types of zeolites is coordinated with the dimensions of the styrene and leads to selective adsorption.

FIG. 3 shows a table with the results of an odor test of five monofilms. It was examined how strongly the films produced as per the method according to the invention emit styrenes, compared with films to which no zeolite was added. Thereby, film TK 30988 is the reference film. The other films were mixed with, respectively, 1% by weight, zeolite powder. The films consisted of 50% of a styrene block polymer, 35% polystyrene, polyethylene and additives.

Prior to the film production in the casting method, compounding is performed. During the compounding process, a base mixture of the polymer components is mixed with additional substances such as oil. This mixing is performed in twin screw extruders with special dosing elements. A granulate is obtained that can then be dosed without any problem during film extrusion. If the zeolites are mixed in during the compounding process it is assumed that they are better distributed in the matrix. However, the zeolite material is then exposed to shear strain and to higher temperatures during compounding, as well as during extrusion in the plastic melt.

In the production of the film TK 30989, zeolites of the type H-MFI-400 were mixed in during the compounding process. The film TK 30990 contains H-MFI-1200 zeolites that were likewise added during the compounding process. During the production of the film TK 30991, zeolite powder of the type H-MFI-400 was added during casting extrusion. Film TK 30992 contains H-MFI-1200 zeolites that were also added during casting extrusion.

The films were stored in 1000 ml wide-neck flasks at standard climatic conditions (23° C./50% rh). Three DIN A4 sheets or 150 g of granulate were used as sample quantities. Five testers examined the odor after three days according to the following evaluation scheme:

0=no perceptible odor deviation
1=barely perceptible odor deviation
2=weak odor deviation
3=significant odor deviation
4=strong odor deviation (not necessarily the perceptible maximum)

As reference, the testers either used an empty wide-neck flask or a material that was specified as the standard by the project leader. The chronological distance between the examination events was approximately 15 minutes.

Film TK 30990 was found had the best results. It contains zeolites of the type HMF1-1200 that are added during the compounding process. Equally good results are obtained with the zeolite type, Na-MFI-1200.

FIG. 4 shows a table with the results of an odor test of three mono-films. Thereby, film TK 31140 is the reference film. The films consist of 50% of a styrene block copolymer, 35% polystyrene, polyethylene and additives.

Film TK 31141 contains only 1% by weight zeolite powder. To film TK 31142, zeolite powder of 2% by weight was added. In both cases, zeolites of the type H-MFI-1200 were used. In both cases, these were mixed in during the compounding process already. Seven testers judged the odor in these experiments.

At 1.6, film 31142 had a somewhat better average than film 31141 with 2.0. An increase of the zeolite proportion to 2% leads to a slight improvement of the ability to adsorb.

FIG. 5 shows a table with the results of additional odor tests. Film TK 32143 does not contain any zeolites and is the reference film. In additional series of experiments, zeolites of the type Na-MFI-1200 were mixed in, the zeolite proportion was varied between 1% by weight and 5% by weight, and the zeolite powder was always mixed in during the compounding process. Seven testers judged the odor in the experiment series TK 32145 to TK 32147. The adsorption improves as the zeolite proportion increases. Subjectively, somewhat even better results are achieved with the zeolite Na-MFI-1200, than with the zeolite types H-MFI-400 and H-MFI-1200

I claim:

1. A method of making an elastic film used in making a diaper closure or elastic for a diaper, the method comprising the steps of:
 (a) premixing polymer components and a white oil approved for use in medical applications as a plasticizer oil to form a polymer composite that contains styrene block copolymers;
 (b) extruding the polymer composite to make an elastic film having at least one layer; and
 (c) adding during the premixing or the extruding in a proportion of 1% by weight to 5% by weight of the elastic film, a mixture of first and second zeolites of the ZSM-5 structural type wherein the first and second zeolites in the mixture have pore openings of approximately 3 Angstroms and approximately 5 Angstroms respectively, so that the first and second zeolites thereby forming the elastic film having at least one layer with a polymer matrix, wherein the zeolites are embedded in the polymer matrix and homogeneously distributed throughout the polymer matrix so that the elastic film having at least one layer minimizes the odor of styrene monomers released by the styrene block copolymers.

2. The method of making an elastic film defined in claim 1 wherein the polymer mixture contains more than 40% by weight of styrene block copolymers.

3. The method of making an elastic film defined in claim 1 wherein the polymer composite contains a styrene block copolymer, polystyrene and polyethylene.

4. The method of making an elastic film defined in claim 2 wherein styrene block polymer is a styrene isoprene styrene block copolymer (SIS), styrene ethylene butylene styrene copolymer (SEBS), styrene butadiene styrene copolymer (SBS) or a mixture of these polymers.

5. The method of making an elastic film defined in claim 1 wherein according to step (c) the amount of zeolite in the mixture of the first and second zeolites having different pore sizes added during the premixing or the extruding of the polymer composite is 5% by weight of the elastic film.

\* \* \* \* \*